Feb. 28, 1956   C. K. PAUL   2,736,549
TORQUE SUSPENSION WEIGHING SCALE
Filed April 6, 1953   2 Sheets-Sheet 1

"X" DISTANCE MUST EQUAL "Y"

INVENTOR
Claude K. Paul
BY Gustave Miller
ATTORNEY

Feb. 28, 1956 C. K. PAUL 2,736,549
TORQUE SUSPENSION WEIGHING SCALE
Filed April 6, 1953 2 Sheets-Sheet 2

INVENTOR
Claude K. Paul
BY Gustave Miller
ATTORNEY

United States Patent Office 2,736,549
Patented Feb. 28, 1956

2,736,549
TORQUE SUSPENSION WEIGHING SCALE
Claude K. Paul, Duncan, Okla.
Application April 6, 1953, Serial No. 346,943
8 Claims. (Cl. 265—55)

This invention relates to a portable platform weighing scale and has for an object to provide a torque suspension platform weighing scale that is readily portable, that may be provided with skids or wheels, or carried by a vehicle, and be set up in the fields for weighing cattle or other livestock or farmers' products.

A further object of this invention is to provide a portable platform torque suspension weighing scale which is fairly low in cost of production, is fairly rugged and is readily portable.

A further object of this invention is to provide a torque suspension platform weighing scale that does not require precise leveling, and in one form may be provided with ready compensation for lengthwise tilt of the platform base.

A further object of this invention is to provide a torque suspension weighing scale, and also one which may be constructed of galvanized iron and other non-corrosive materials to be quite weather resistant.

Normally, platform scales are provided with leverage systems involving knife edge supports of extreme accuracy, thus making for expensive production and great difficulty in portability. With this invention, the weighing platform is suspended on cables on and above a rugged base, and the cable is wrapped about cylindrical members at the ends of transmitting levers so that the weight on the platform creates a torque on the cylindrical members which is transmitted by the levers through cables secured thereto and to a weighing scale, which weighing scale may be any conventional weighing scale, such as a steelyard scale, a spring balance scale, a regular scale balance beam, or to a special scale balance beam including tilt compensating means peculiarly cooperating with the torque suspension cable means of the platform to be adjustable to compensate for a small reasonable degree of tilt of the supporting base thereof.

With the foregoing and other objects in view, this invention comprises the combination, construction and arrangement of parts hereinafter set forth, claimed and disclosed in the accompanying drawings, wherein:

Figure 1:
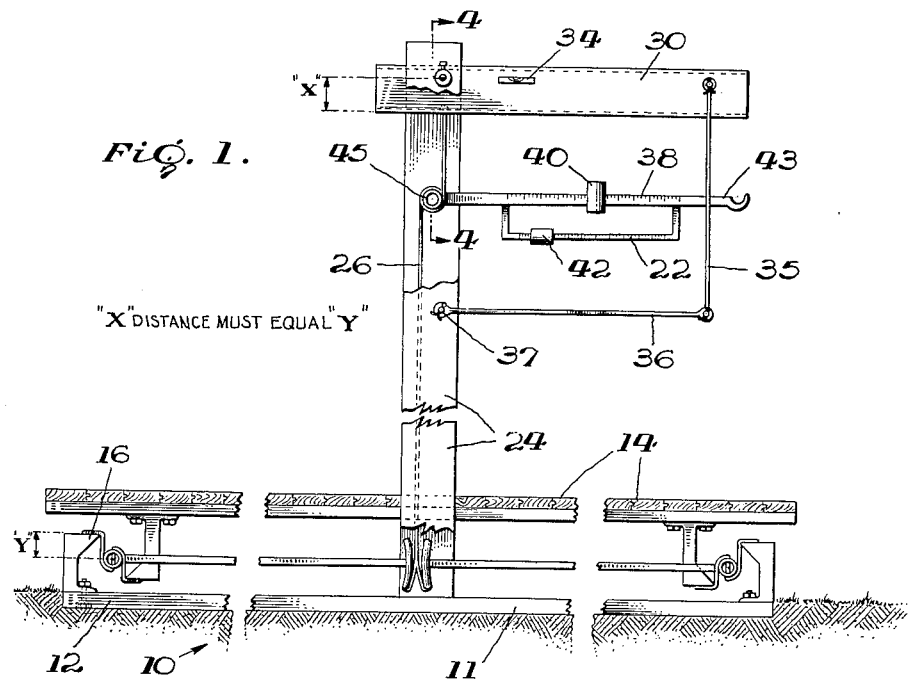
Fig. 1 is a side elevational view, partly broken away, of the portable torque suspension platform weighing scale of this invention.
Figure 2:
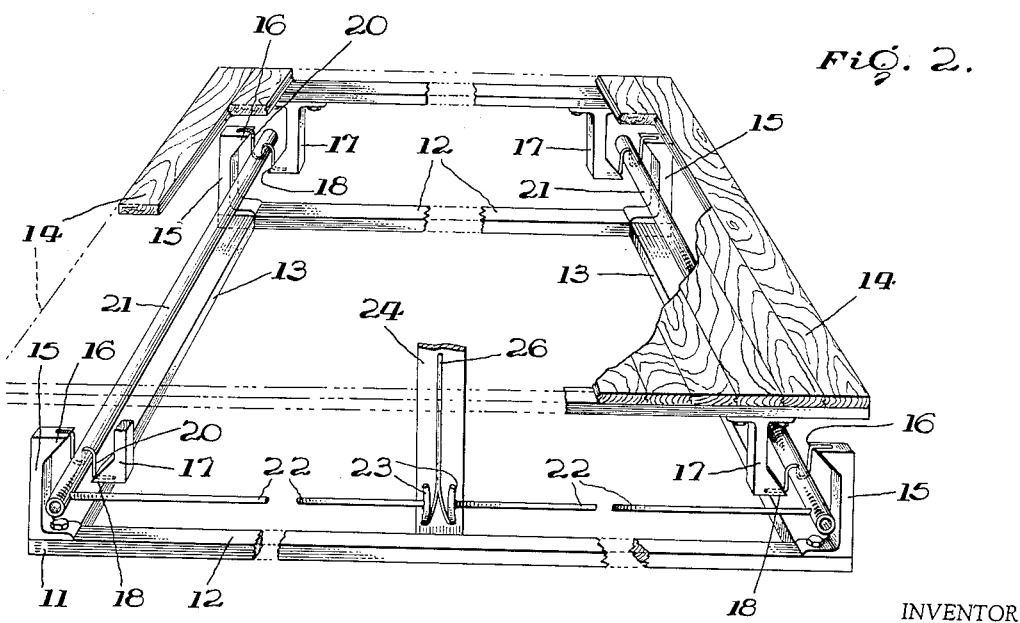
Fig. 2 is a perspective, partly broken away view, of the platform torque suspension means, base and platform.

There is shown at 10 the portable torque suspension platform weighing scale of this invention comprising a rectangular base 11, which, as shown, may consist of two pairs of iron bars 12 and 13 secured together and galvanized to be corrosion resistant.

The base 11 supports a rectangular weighing platform 14 thereabove by means of a torque suspension means consisting of uprights 15 at each corner of the base 11 having overhanging lips 16. The overhanging lips 16 at each end of each long base side 12 point inwardly parallel to the long side 12 of the base, while the platform 14 has correspondingly placed depending legs 17, each leg 17 having a projecting toe 18 pointing outwardly toward the adjacent overhanging lip 16. A flexible cable 20 is provided for each corner of the scale and is secured at its end to the overhanging lip 16 and the projecting toe 18.

Extending parallel to the short sides 13 of the scale are a pair of cylindrical member or tubes or rods 21 which are secured to the midpoints of the flexible cables 20 at each end thereof by having the cable 20 from the overhanging lip 16 extend downwardly and then tangentially about the outer side of the tube 21 to the bottom thereof, then upwardly through a suitable hole therein to the top side, then downwardly and tangentially about the inner side of the tube or cylindrical member 21 to the projecting toe 18 where it is secured. Each cable 20 is clamped or secured to tube 21 by any suitable means to prevent slipping therethrough. The diameter of the cylindrical member 21 is such that, when the scale base 11 is supported on a level ground or floor, the portions of the cable 20 between the lip and the toe and the points of tangency on the cylindrical member are vertical. As thus suspended, the cable 20 exerts a torque tending to rotate the cylindrical member in the direction of the suspending portions of the cables 20, and this torque is transmitted to and means by a scale weighing means as follows.

Adjacent the same one end of the cylindrical member 21 there is rigidly secured a lever 22 of a length slightly less than one-half the distance between the two cylindrical members 21 and at the inner ends of the levers 22 there are secured small arc members 23 having a radius equal to the distance between the curved surface of the arc and the point of tangency of the portion of the cable suspending 20 depending from the overhanging lip 16. Supported on the adjacent long side base bar 12 adjacent the arc ends of levers 22 are a pair of uprights forming a pillar 24 for supporting the scale 25, generally shown in Fig. 3. Depending from the scale 25 is a pillar cable 26 having bifurcated end portions secured to the lowermost ends of the arc members 23 and extending tangentially along the curved surface of the arc members 23.

Figure 7:
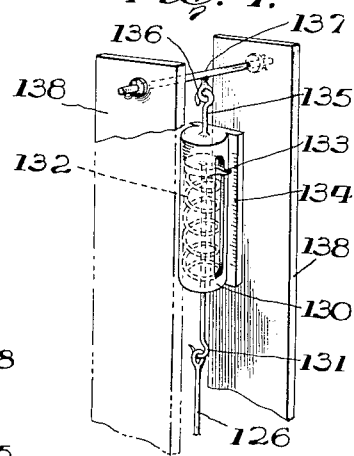
Fig. 7 shows a spring balance scale form of this invention.
Figure 4:
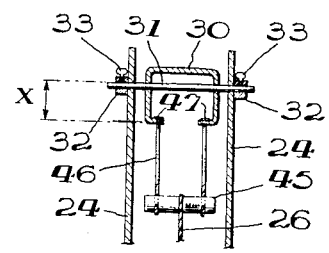
Fig. 4 is a section on line 4—4 of Fig. 1.
Figure 5:
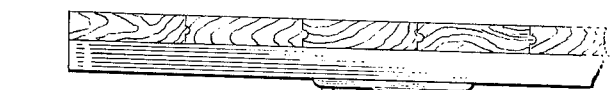
Fig. 5 is a view on a larger scale of the platform, torque suspension, and base means.
Figure 5:
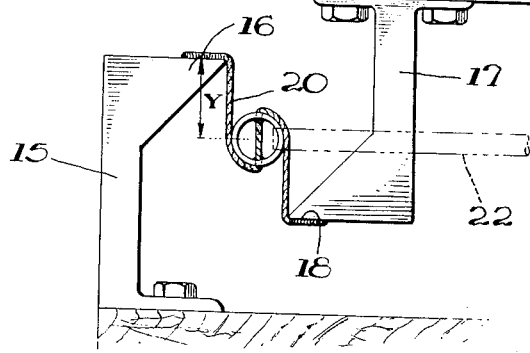

When the scale used is a conventional spring scale 130, as shown in Fig. 7, the transmitting pillar cable 126 is attached at its upper end to the bottom hook 131 thereof with a spring 132 compressed thereby to move a pointer 133 over a series of scale graduations 134, the scale 130 being supported by an upper hook 135 from an eye 136 midway of a supporting rod 137 between the pillar uprights 138.

Figure 6:
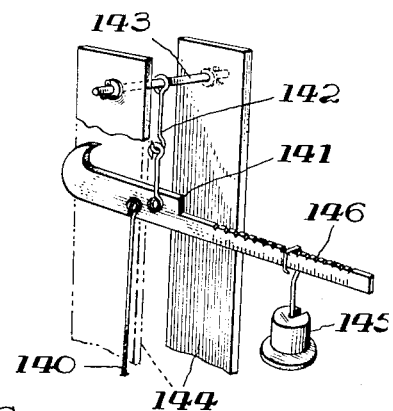
Fig. 6 shows a steelyard scale form of this invention.

When the scale used is a conventional steelyard scale as in Fig. 6, the transmitting pillar cable 140 is secured to the steelyard 141 to one side of its pivoting supporting links 142 from the supporting rod 143 between the pillar uprights 144, steelyard weighing pea 145 being movable over its graduated end 146 in the usual manner.

Figure 3:
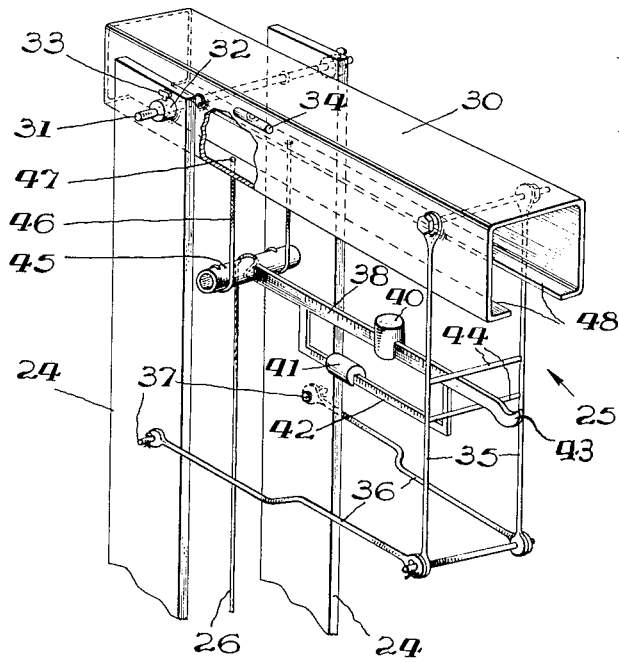
Fig. 3 is a perspective view of the tilt compensating balance scale beam form of this invention.

When, however, the supporting ground or floor may not be exactly level, then it is preferred to provide the beam scale 25 of the particular type shown in Figs. 1 and 3 which is self-compensating for any reasonable tilt of the base in the direction of the long side 12 of the platform base 11. At the upper ends of the pillar 24 there is supported a parallelogram scale beam guide consisting of an upper guide beam 30 having an axle 31 fixed thereto and pivotally extending through fixed bearing journals 32 on the upper ends of the pillar 24, the journals 32 being provided with winged locking set screw 33 so that after being pivoted to a level position, as determined by a bubble type level 34, it may be locked in such level position. Pivotally descending from the other end of upper guide beam 30 is a weighing beam guide stop 35 whose lower end is pivoted to a pair of lower guide beam rods 36, the other ends of which are separately pivoted at 37 to the uprights of the pillar 24 as shown, thus completing the parallelogram.

A standard weighing beam 38, provided with a weighing pea 40 on its calibrated bar, with a balance adjusting weight 41 and beam 42, has one end 43 extending between the beam guide stop cross bars 44 of beam stop 35, the weighing beam end 43 being hooked as usual to provide for suspending the usual extra removable weights. The other end of the weighing beam 38 has attached thereto a pipe or tubular bar 45, and the pillar transmitting cable 26 extends tangentially up around the side thereof opposite to the weighing beam 38 and is secured thereto at or over the top thereof. Then, from the bottom of the outer ends of the pipe or tubular bar 45 there are secured suspending cables 46 extending tangentially upward around the beam side thereof and vertically upward and then secured at their upper end 47 to the inturned flanges 48 of the upper guide beam 30 vertically below the beam guide axle 31.

The vertical distance from the beam guide axle 31 to upper ends of suspending cables 46, as shown at X, must be exactly the same as the vertical distance Y between the overhanging lip 16 and the point of tangency between the suspending cable 20 and the cylindrical member 21. As a natural result of this arrangement, regardless of any reasonable tilt in the lengthwise plane, i. e., one short end of the base being higher than the other, the pull on the pillar transmitting cable 26 and the final torque exerted on the pipe or tubular bar remains the same, providing the slight adjustment of the cable 26 to a position vertical to the plane formed by the ends of projecting toes 18 has been made by adjusting the upper guide beam 30 and lower guide beam rods 36 to a level horizontal position as shown by the level 34.

Obviously, all the cables may be of any suitable flexible material, such as nylon, chain, rope, wire, etc., and instead of being wrapped about and through the cylindrical members, could be wrapped about and secured through pulleys rigidly secure to the ends thereof.

In operation, placing of any object to be weighed on the platform, such as livestock, grain, farm products, etc., will cause the depending leg projecting toes 18 to exert a downward pull on the lower ends of cables 20, thus rotating the lever sides of cylindrical members 21 downwardly and lowering the arced ends of levers 22 in direct proportion to the weight. The ends of the arcs 23 then transmit the torque through the pillar cable 26 to the spring scale 132, or the steelyard 141, or the beam scale 38. In the case of the beam scale 38, if the supporting ground or floor is not exactly level, the beam guide 30 will first be leveled, as above set forth, before the weighing operation. In this case, the lengthwise tilt does have the effect of reducing the actual weight of the levers and the pull exerted on pillar transmitting cable 26 by that factor, but this error is automatically corrected when the balance of the scale is adjusted prior to its use for actual weighing in a specific position.

Two basic features of this arrangement contribute to advantages. First, instead of using fixed pivots on a lever as support of the platform, the substitution of a circular object such as a pipe (or diametrically opposite arcs of such a circumference) as the means of originating leverage application reduces the amount of heavy steel beam material needed in the levers and structure to attain accuracy and it reduces the amount of precision work required in constructing and mounting pivots. Secondly, by suspending this circumference between the base and the platform by means of a cable, chain, or other suitable flexible material, the effect of error normally encountered in construction is materially reduced. All friction except resistance of the cable to flexing is removed. Also, shock of horizontal motion, instead of being transmitted directly to fixed pivots and levers as is true of a platform thus supported, is to a considerable degree absorbed by sway of the cables which suspend the platform. In weighing animate objects this makes for steadier reaction and easier reading of the balance beam or dial indicator.

The combination of the two basic features makes a durable unit for accurately weighing objects on a platform tilted in a lengthwise plane. Because weights can be read with the unit on a slope and because shock damage of horizontal movement to precision parts is largely eliminated, it becomes possible to mount the unit on wheels or skids and realize a really workable, portable, large sized scale unit.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A torque suspension weighing scale comprising a base, L-shaped uprights on said base, a weighing platform, L-shaped legs depending from said platform, torque suspension means supporting said weighing platform on said base in free swinging relation thereto, said torque suspension means comprising a flexible means extending from the short leg of the L at the top of each upright to the short leg of the L at the bottom of the adjacent leg, the said flexible means being of a length to maintain said weighing platform out of contact with the tops of said uprights and said legs out of contact with said base, torque means out of contact with said leg and said uprights secured intermediately of said flexible means between each upright and its associated leg having a torque created thereon by said flexible means upon movement of said weighing platform, a scale, and means for transmitting the torque to said scale.

2. A torque suspension platform weighing scale comprising a base, a weighing platform, torque suspension means supporting said weighing platform on said base, said torque suspension means comprising flexible means suspending said platform from said base, torque means secured to an intermediate portion of said flexible means having a torque created thereon by said flexible suspending means, a weighing scale, means for transmitting the torque to said weighing scale, said torque means comprising cylindrical means to which said flexible suspending means is tangentially secured in a manner tending to rotate it, said torque transmitting means including lever means rigidly mounted at one end on said cylindrical means, and means connecting the other end of said lever means to said weighing scale, said weighing scale including a weighing scale beam, a parallelogram beam guide means including a pillar supported on said base, a pair of guide beams pivoted on one of their ends to said pillar, a scale beam stop means pivotally secured to the other ends of each of said guide beams, level indicating means on said guide beams, means for securing said guide beams against pivoting on said pillar, a torque receiving cylindrical means mounted on the pillar end of said scale beam and extending parallel to said first mentioned cylindrical means, and flexible means secured tangentially to said scale beam cylindrical means on the scale beam side thereof at one end and at its other end to the upper one of said guide beams at a point vertically below its pivotal connection to said pillar, the distance between said point and said pivotal connection being the same as the distance between the suspension point of said flexible suspending means on said base and its tangential connection to said first mentioned cylindrical means, said connecting means between said lever means and said weighing scale comprising a flexible means secured at one end to said lever means and at its other end tangentially to said scale beam cylindrical means opposite from said scale beam side.

3. A torque suspension platform weighing scale comprising a base, a weighing platform, torque suspension means supporting said weighing platform on said base, said torque suspension means comprising flexible means suspending said platform from said base, torque means secured to an intermediate portion of said flexible means having a torque created thereon by said flexible suspending means, a weighing scale, means for transmitting the torque to said weighing scale, said torque means comprising cylindrical means to which said flexible suspending means is tangentially secured in a manner tending to rotate it, said torque transmitting means including lever means rigidly mounted at one end on said cylindrical means, and means connecting the other end of said lever means to said weighing scale, said weighing scale including a weighing scale beam, a parallelogram beam guide means including a pillar supported on said base, a pair of guide beams pivoted on one of their ends to said pillar, a scale beam stop means pivotally secured to the other ends of each of said guide beams, level indicating means on said guide beams, means for securing said guide beams against pivoting on said pillar, a torque receiving cylindrical means mounted on the pillar end of said scale beam and extending parallel to said first mentioned cylindrical means, flexible means secured tangentially to said scale beam cylindrical means on the scale beam side thereof at one end and at its other end to the upper one of said guide beams at a point vertically below its pivotal connection to said pillar, the distance between said point and said pivotal connection being the same as the distance between the suspension point of said flexible suspending means on said base and its tangential connection to said first mentioned cylindrical means, and arc means on the other ends of said lever means having a radius equal to its distance from the point of tangential connection to said base suspended flexible means, said connecting means between said lever means and said weighing scale comprising a flexible means secured at one end tangentially to said arc means on said lever means and at its other end tangentially to said scale beam cylindrical means opposite from said scale beam side.

4. A platform torque suspension weighing scale comprising a rectangular base, a rectangular weighing platform, and means for suspending said platform from and above said base comprising an upright having an overhanging lip mounted at each corner of said base, said overhanging lips being pointed inwardly parallel to the long side of the rectangle, a depending leg mounted adjacent the bottom of each corner of said platform, said leg having a projecting toe extending outwardly toward the overhanging lip of the adjacent base upright, a cylindrical member extending transversely of said scale on each short side thereof intermediate said overhanging lips and said projecting toes, a flexible member at each corner secured at one end to said overhanging lip and at its other end to said projecting toe and having an intermediate portion thereof connected to said cylindrical member and extending partly around said cylindrical member in a direction tending to rotate the side of said cylindrical member toward the center of said scale in a downward direction, said flexible member extending from the overhanging lip, down around the outer side of the cylindrical member, diametrically upward through said cylindrical member and downwardly over the inner side to the projecting toe, a lever secured rigidly at its outer end to the inner side of each cylindrical member adjacent one longitudinal side of the scale and extending to close to the midpoint of said longitudinal side, an arc secured to the inner end of each lever, the radius of each said arc being equal to distance between said arc and the point of tangency of said lip supported cable portion and said cylindrical member, a pillar mounted on said base adjacent said arcs, a weighing scale mounted at the upper end of said pillar, and a pillar cable secured at its upper end to said weighing scale and bifurcated at its lower end with each bifurcation tangent to one lever arc and secured thereto at the bottom thereof.

5. The platform weighing scale of claim 4 and mounting means for said scale balance beam compensating for one of said opposite sides of said base being supported at a different elevation than the other of said opposite sides, said beam balance scale extending parallel to said levers, said tilt compensating mounting means comprising a parallelogram consisting of said pillar, an upper guide beam and a lower parallel balance guide beam each pivoted to said pillar at one end and a balance beam limit stop means pivotally secured to the opposite ends of each said guide beam, a level indicator mounted on one of said guide beams, means for locking said guide beams in leveled position on its pillar pivots, pivot means for said scale balance beam comprising a cylindrical member to one side of which it is rigidly secured, and cable means secured to said beam cylindrical member and wrapped thereabout and extending tangentially therefrom on the balance beam side thereof upwardly and secured to said upper guide beam at a point vertically below its pillar pivot, the distance between said point and said pillar pivot being equal to the length of the platform suspending cable between its supporting overhanging lip and its point of tangency to its suspended cylindrical member.

6. A platform weighing scale comprising a rectangular base, a rectangular weighing platform, and means for suspending said platform from and above said base comprising two pairs of uprights, the uprights of each pair being mounted adjacent the ends of two opposite sides of said base, each upright having an overhanging lip, a depending leg mounted adjacent the bottom of each corner of said platform, said leg having a projecting toe extending outwardly toward the overhanging lip of the adjacent base upright, a cylindrical member extending transversely of said scale, parallel to each said opposite side thereof intermediate said overhanging lips and said projecting toes, a flexible member at each corner secured at one end to said overhanging lip and at its other end to said projecting toe and having an intermediate portion thereof connected to said cylindrical member in a direction tending to rotate the side of said cylindrical member toward the center of said scale in a downward direction, each said cylinder member being otherwise free from contact with either said platform legs or said base uprights, a lever secured rigidly at its outer end to the inner side of each cylindrical member adjacent one intermediate side of the scale and extending to close to the midpoint of said intermediate side, an arc secured to the inner end of each lever, the radius of each said arc being equal to distance between said arc and the point of tangency of said lip supported flexible member portion and said cylindrical member, a pillar mounted on said base adjacent said arcs, a weighing scale mounted at the upper end of said pillar, and a pillar cable secured at its upper end to said weighing scale and bifurcated at its lower end with each bifurcation tangent to one lever arc and secured thereto at the bottom thereof.

7. A platform weighing scale comprising a rectangular base, a rectangular weighing platform, and means for suspending said platform from and above said base comprising two pairs of uprights, the uprights of each pair being mounted adjacent the ends of two opposite sides of said base, each upright having an overhanging lip, a depending leg mounted adjacent the bottom of each corner of said platform, said leg having a projecting toe extending outwardly toward the overhanging lip of the adjacent base upright, a cylindrical member extending transversely of said scale parallel to each said opposite side thereof intermediate said overhanging lips and said projecting toes, a flexible member at each corner secured at one end to said overhanging lip and at its other end to said projecting toe and having an intermediate portion thereof connected to said cylindrical member in a direction tending to rotate the side of said cylindrical member toward the center of said scale in a downward direction, said flexible member extending from the overhanging lip down around the outer side of the cylindrical member, diametrically upward through said cylindrical member and downwardly over the inner side to the projecting toe, a lever secured rigidly at its outer end to the inner side of each cylindrical member adjacent one intermediate side of the scale and extending to close to the midpoint of said intermediate side, an arc secured to the inner end of each lever, the radius of each said arc being equal to distance between said arc and the point of tangency of said lip supported flexible member portion and said cylindrical member, a pillar mounted on said base adjacent said arcs, a weighing scale mounted at the upper end of said pillar, and a pillar cable secured at its upper end to said weighing scale and bifurcated at its lower end with each bifurcation tangent to one lever arc and secured thereto at the bottom thereof.

8. A platform weighing scale comprising a rectangular base, a rectangular weighing platform, and means for suspending said platform from and above said base comprising an upright having an overhanging lip mounted at each corner of said base, said overhanging lip being pointed inwardly parallel to the same one side of the rectangle, a depending leg mounted adjacent the bottom of each corner of said platform, said leg having a projecting toe extending outwardly toward the overhanging lip of the adjacent base upright, a cylindrical member extending transversely of said scale on two sides thereof at right angles to and intermediate said overhanging lips and said projecting toes, a flexible member at each corner secured at one end to said overhanging lip and at its other end to said projecting toe and having an intermediate portion thereof connected to said cylindrical member and extending partly around said cylindrical member in a direction tending to rotate the side of said cylindrical member toward the center of said scale in a downward direction, said flexible member extending from the overhanging lip down around the outer side of the cylindrical member, diametrically upward through said cylindrical member and downwardly over the inner side to the projecting toe, a lever secured rigidly at its outer end to the inner side of each cylindrical member adjacent one side of the scale and extending to close to the midpoint of said one side, an arc secured to the inner end of each lever, the radius of each said arc being equal to distance between said arc and the point of tangency of said lip supported cable portion and said cylindrical member, a pillar mounted on said base adjacent said arcs, a weighing scale mounted at the upper end of said pillar, and a pillar cable secured at its upper end to said weighing scale and bifurcated at its lower end with each bifurcation tangent to one lever arc and secured thereto at the bottom thereof.

References Cited in the file of this patent

UNITED STATES PATENTS

| 1,759,886 | Bousfield | May 27, 1930 |

FOREIGN PATENTS

| 188,987 | Germany | Sept. 26, 1907 |
| 239,984 | Switzerland | Mar. 1, 1946 |